Patented Mar. 13, 1934

1,950,436

UNITED STATES PATENT OFFICE 1,950,436

POLYMERIZED HALOGENATED HYDROCARBONS AND PROCESS OF PRODUCING SAME

Ira Williams, Wilmington, Del., assignor to E. I. du Pont de Nemours & Company, Wilmington, Del., a corporation of Delaware No Drawing. Application February 28, 1931, Serial No. 519,244

38 Claims. (Cl. 260—2)

This invention relates to the preparation of polymerizable polymer products of chloro-2-butadiene-1,3 which by reason of their plasticity and solubility are adapted to be formed or shaped and from which, upon further polymerization, may be obtained a solid tough elastic material closely resembling vulcanized rubber in its physical properties. Further, it relates to the fabrication of articles of manufacture from polymers of chloro-2-butadiene-1,3.

The preparation of chloro-2-butadiene-1,3 has been fully disclosed in an application of Carothers and Collins, Serial No. 490,538, filed October 22, 1930. Hydrogen chloride and monovinylacetylene react directly to form this product under a great variety of conditions.

Moreover, Carothers and Collins, in their application Serial No. 519,243, filed February 28, 1931 disclose that by polymerizing chloro-2-butadiene-1,3 it is possible to obtain products having various degrees of solubility, plasticity, elasticity and strength. These polymer products have been obtained not only in the form of rubber-like masses but also in the form of readily volatile odorous liquids, viscous soft sticky masses and hard very tough granular masses. As clearly appears from that case, the nature of the product depends primarily upon the conditions under which polymerization is effected.

However, the chloro-2-butadiene-1,3 polymers elsewhere described when in the form of tough elastic insoluble solids resembling cured rubber in their properties are not adapted to be worked on the rolls of a rubber mill or formed to produce articles of the desired shape. Somewhat plastic products have been obtained by suitable control of the polymerization but such products have had, to a greater or less degree, a tendency to slowly resume their former shape upon stretching and are not adapted to be easily worked on a rubber mill or have resembled Balata in that they may not be cured to produce tough elastic products.

An object of the present invention is to produce a plastic product resembling unvulcanized Hevea rubber in its physical properties and also adapted to be shaped and cured to form a tough elastic mass resembling vulcanized rubber. A further object is to produce from 2-chlor-buta-1:3-diene tough elastic articles of predetermined shape.

With these objects in view it has been discovered that 2-chlor-buta-1:3-diene which has been polymerized under certain conditions until the viscosity has noticeably increased contains plastic polymers and that if the polymerization is interrupted before completed at the proper stage and the unpolymerized and more volatile material removed a product having the desired properties may be obtained. These polymers are characterized by their insolubility in alcohol, glycerine, acetone and similar solvents and by their solubility in the common rubber solvents such as benzene, chloroform, carbon disulfide and carbon tetrachloride. This plastic product is not only readily worked and compounded on a rubber mill but shows no substantial tendency to resume its former shape when moulded. At the same time it is adapted to be further polymerized to form an extremely tough elastic product resembling vulcanized rubber.

In the preparation of this plastic polymer product from chloro-2-butadiene-1,3 the polymerization is usually permitted to proceed until the chloro-2-butadiene-1,3 has become decidedly more viscous and may be allowed to proceed until the mass is just too stiff to pour. In general, the polymerization of chloro-2-butadiene-1,3 may be effected under a variety of conditions as shown by Collins and Carothers. Thus the polymerization may be carried on under ordinary conditions of temperature and pressure, in the presence or absence of polymerization catalysts or anticatalysts, in the presence or absence of direct light, at elevated temperatures and pressures or at reduced temperatures and pressures. The conditions under which this polymerization occurs will, however, as disclosed by Carothers and Collins, very largely influence the rate of polymerization. As disclosed by Carothers and Collins, among the materials which retard the polymerization are inert solvents, phenolic bodies, such as hydroquinone, catechol, pyrogallol, the naphthols, and aromatic or aliphatic amines. Among the accelerators of polymerization are oxygen, turpentine, benzoyl peroxide and light.

Because of the accelerating effects of heat, pressure, catalysts, etc. the extent of polymerization best suited for the purposes of the present invention can not be measured in terms of time, but must be determined, as already indicated, largely by the physical state of the product. The degree of polymerization best suited for the purposes of the invention also is governed to some extent by the conditions to be employed in the step of separating the unpolymerized chloro-2-butadiene-1,3 as more fully discussed below.

In addition to affecting the degree of polymerization attained in a given time the conditions under which the polymerization and separation of the volatile residue occurs also affect the properties of the plastic product. Thus, while plastic polymers may be obtained at temperatures higher than 50° C., polymerizable polymers so obtained are less plastic than those prepared at lower temperatures. The higher temperatures are, moreover, unfavorable to yields of plastic polymer in excess of 20% of the chloro-2-butadiene-1,3. Accordingly, for present purposes, temperatures below 50° C. and especially between 5° C. and 30° C. are preferred for polymerization and below 30° C. for separation. Under the preferred conditions of polymerizing the chloro-2-butadiene-1,3 is exposed to the action of a Cooper Hewitt lamp during polymerization and maintained at a temperature between 5° C. and 30° C. until the desired state of polymerization has been attained and the chloro-2-butadiene-1,3 removed.

The separation of the plastic polymer from the chloro-2-butadiene-1,3 may be accomplished either by precipitation or by distillation. These polymers when so separated and exposed to the air either at ordinary or elevated temperature or when subjected to heat and reduced pressure, lose the remaining unpolymerized chlordiene and precipitating liquid and form a product closely resembling unvulcanized rubber in physical properties.

Separation by the precipitation method will be first described. This embodiment of the invention is based on the discovery that when viscous and partially polymerized chlordiene is poured into a solvent in which the plastic polymer is insoluble the unchanged chlordiene is dissolved and the plastic polymers are precipitated.

Liquids which are satisfactory for precipitating the high molecular weight polymers are in general those liquids in which 2-chlor-buta-1:3-diene is soluble and which will not dissolve natural unvulcanized rubber.

The following examples show the preparation of the plastic polymer and its separation by the precipitation method. It is to be understood that these examples are purely illustrative and that it is not applicant's intention to limit his invention to the specific conditions therein specified.

Example I 200 g. of freshly distilled 2-chloro-buta-1:3-diene and 1 g. of turpentine were permitted to stand at room temperature for 24 hours. During this time the viscosity increased to the consistency of glycerine. This product was then stirred into 500 cc. of methyl alcohol when a white plastic mass was formed. This was kneaded with fresh alcohol and finally was worked on a cold rubber mill until most of the excess alcohol was squeezed out. The temperature of the rubber mill was then raised and the remaining volatile material was driven off. A yield of 40 g. of light yellow plastic material resembling milled pale crepe rubber resulted. This product dissolved in benzene to produce a solution resembling rubber cement. Upon being heated it cured to form a tough elastic rubber-like product.

Example II 200 g. of freshly distilled 2-chlor-buta-1:3-diene and 1 g. of benzoyl peroxide were permitted to stand at room temperature for 48 hours. At the end of this time the mixture was almost too viscous to pour. It was then kneaded for 5 minutes under 500 cc. of ethyl alcohol, after which it was kneaded with 500 cc. of fresh alcohol. The resulting stiff dough was worked first on a cold and then on a hot rubber mill, during which time 2 grams of phenyl-beta-naphthylamine antioxidant were added. A yield of 80 grams of dark green plastic material resembling milled rubber and soluble in benzene was obtained. The plastic material was capable of being further polymerized to form a product resembling cured rubber.

Example III 100 cc. of 2-chlor-buta-1:3-diene were mixed with 100 cc. of benzene. After standing two weeks at room temperature the viscous mixture was thoroughly washed several times with acetone. The resulting plastic mass was worked on a porous plate until most of the acetone was removed. The resulting product closely resembled those of Examples I and II.

Example IV 500 g. of 2-chlor-buta-1:3-diene were placed in a 750 cc. flask and exposed to the light of a 1000-watt lamp at a distance of 15 inches. After 20 hours the material had become too viscous to pour. It was then worked in 1000 cc. of ethyl alcohol containing 5 g. of hydroquinone. After being thoroughly worked, the plastic mass was finally dried on a warm rubber mill. About 200 grams of plastic, polymerizable polymer was obtained.

In place of the alcohol or acetone, employed as the precipitating agent in the above examples, any other inert solvent for the chloro-2-butadiene-1,3 in which the plastic polymer is insoluble may be employed. Among the other liquids which have successfully been used are methyl alcohol, propyl and isopropyl alcohol, butyl alcohol, methyl ethyl ketone and diethyl ketone.

As illustrated in Example III, in certain cases it may be desirable to employ the method disclosed by Carothers, Collins and Kirby in their application, Serial No. 519,242, filed on even date herewith, and dilute the 2-chlor-buta-1:3-diene before polymerization or during polymerization in order to more easily control the reaction. As disclosed in the above identified application, liquids which may be used as diluents are those in which both the chlorbutadiene and the polymers are soluble. Among the liquids which have been used are benzene, toluene, carbon tetra chloride, chloroform, and carbon disulfide. After polymerization the high molecular weight polymer is obtained from the resulting solution by the addition of alcohol, acetone or other of the precipitating liquids mentioned above to dissolve the unpolymerized 2-chlor-buta-1:3-diene.

Separation of the plastic polymer from partially polymerized chloro-2-butadiene-1,3 by the distillation method will next be described.

The partial polymerization prior to separation may for the purpose of this embodiment be carried out under any of the conditions already described. However, the extent to which the polymerization is carried is determined somewhat by the method to be employed for distilling out the unpolymerized chlordiene. If the separation is to be carried out without stirring, it is generally better to employ chlordiene in the early and less viscous stages of polymerization. If the polymerized mass is to be worked by some mechanical means during separation, a more highly polymerized mass may be employed. The polymerization should not be carried to a state where it will no longer dissolve in benzene. To facilitate control of the degree of polymerization accelerators may be employed during the first part of the process followed by polymerization retarders such as hydroquinone, catechol, aniline or phenyl-beta-naphthylamine after the desired state of polymerization has been reached.

Although plastic polymers may be produced without the use of reduced pressure and mechanical agitation during the distillation, my preferred method is to employ pressures below atmospheric and to provide agitation during the distillation process, thus avoiding elevated temperatures. During the distillation heat is supplied in sufficient quantity to cause the evaporation of the 2-chlor-buta-1:3-diene, however, and finally the plastic polymer is raised to a temperature slightly above the boiling point of chlordiene at the pressure employed.

The following examples are furnished by way of illustrating the distillation method of preparing the plastic polymer.

*Example V*

One hundred twenty-eight grams of 2-chlor-buta-1:3-diene were polymerized to the consistency of glycerine and distilled from a 300 cc. flask without stirring under a pressure of 6 cm. of mercury. The temperature of the chlordiene dropped to −20° C. until most of the unpolymerized chlordiene was distilled out. Heat was then supplied by means of a water bath at 30° C. until the temperature of the plastic polymer had reached 20° C. 108 g. of 2-chlor-buta-1:3-diene were recovered and 18 g. of plastic polymerizable polymer soluble in benzene but insoluble in alcohol were obtained.

*Example VI*

200 g. of 2-chlor-buta-1:3-diene were polymerized under the action of a 1000-watt Mazda lamp for 20 hours. At the end of this time one gram of phenyl-beta-naphthylamine was added and the material was subjected to distillation with stirring under a pressure of 16 cm. mercury. The temperature was finally raised to 30° C. The amount of chlordiene recovered was 157 g. and 41 g. of plastic polymerizable polymer were obtained.

*Example VII*

100 g. of 2-chlor-buta-1:3-diene, 50 g. of benzene, 5 g. of rosin and 0.5 g. of benzoyl peroxide were permitted to stand for ten days. At the end of this time the product resembled a heavy rubber cement. It was then distilled under a pressure of 20 cm. of mercury and the final temperature brought up to 30° C. The residue in the flask consisted of the plastic polymerizable polymer containing the rosin and closely resembled unvulcanized rubber in its properties. It cured on heating to a tough elastic mass.

*Example VIII*

18 pounds of 2-chlor-buta-1:3-diene were polymerized under the influence of a Cooper Hewitt lamp at a temperature of 20° C. until almost too thick to pour. The polymerized product was then placed with two ounces of phenyl-beta-naphthylamine in an internal mixer and the excess 2-chloro-buta-1:3-diene was distilled out at a pressure of seven inches of mercury. The distillation was continued while the mass was being mixed until no more 2-chlor-buta-1:3-diene was being given off and the temperature in the mixer had increased to about 25° C. Seven and one-half pounds of plastic polymerizable polymer, soluble in benzene and insoluble in alcohol were obtained.

The 2-chlor-buta-1:3-diene in all of the above examples was polymerized in the presence of small amounts of air. No attempt was made either to supply more air or reduce the amount of air necessary to fill the vessel in which the 2-chlor-buta-1:3-diene was polymerized. All polymerizations were carried out under normal pressure, and unless otherwise stated were in glass vessels in the ordinary diffused light of the laboratory.

These conditions, as already explained, may obviously be widely varied as may also the conditions of separation. Thus, the distillation may be carried out at atmospheric pressure and the final temperature although preferably not in excess of 50° C. may be raised to 70° C.

It will be understood that whether the precipitation or distillation method of separation is followed the polymerization may be carried out in the presence of liquids or solid materials or fillers which do not prevent polymerization. The usual fillers and compounding ingredients employed in the rubber art may be incorporated during the distillation and mixing process or solvents such as toluene may be included which permit the plastic polymer to remain in the distillation chamber in the form of a cement.

By the process of this invention, as disclosed above, it is possible to obtain a new and useful product quite distinct from any other polymer which has been produced from 2-chlor-buta-1:3-diene. These products are not only soluble in benzene and plastic to a degree not heretofore attained, thus enabling them to be processed easily with the usual type of rubber machinery, but they are adapted to be cured in the form desired to form tough, elastic, rubber-like articles. This step will be next described.

The plastic curable polymer prepared as described above is adapted for treatment in a manner similar to the methods now employed for the treatment of unvulcanized rubber. By the usual milling or mixing operations the plastic polymer is rendered of such consistency that it will readily take any desired shape. During this treatment, if not previously incorporated, various fillers and modifying agents may be added. Among the various fillers and modifying agents which have been added are the usual diluting, reinforcing, cheapening, retarding, accelerating or antioxidant materials employed with natural rubber. Such materials are zinc oxide, zinc dust, lithophone, blanc fixe, clay, iron oxide, whiting, lime, magnesium carbonate, carbon, slate flour, pine tar, mineral oil, paraffin, mineral rubber, vulcanized oil, rosin, diphenyl guanidine, sulfur, phenyl beta naphthylamine, fatty acids, cork dust, ground leather, cotton, sawdust, and asbestos.

The amount and nature of the material added to the plastic polymer of course depends upon the properties which it is desired to impart to the final mixture. In general, those antioxidants which are antioxidants for natural rubber are also antioxidants for this polymer. In addition those antioxidants which retard the vulcanization of natural rubber, such as hydroquinone, may be used with good results. Those materials which are used as accelerators of vulcanization of natural rubber may be incorporated. Zinc dust and zinc oxide, however, act as curing aids and whiting, lime, magnesia and magnesium carbonate retard vulcanization. Sulfur, selenium or other vulcanizing ingredients which are employed with natural rubber are unnecessary in the curing of these plastic polymers.

The plastic polymers after being brought to a suitable consistency are shaped by the usual methods employed with natural rubber such as milling or calendering into sheets, spreading on fabric, tubing, or molding.

After milling is completed the product is ready to be further polymerized or cured in the form of shaped articles.

The following examples will serve to illustrate the methods which may be employed for the formation of shaped articles. It will be obvious from these examples that this product is adapted for use as a general substitute for rubber. In view however of the enormous scope of this field it will be understood that it is possible to illustrate only a limited number of adaptations.

Example IX

Plastic polymer obtained by precipitation with alcohol from partially polymerized 2-chlor-buta-1:3-diene was mixed with 2% of oleic acid and 3% phenyl beta naphthylamine. This material was then calendered in a thin sheet upon the surface of white broadcloth in such manner that the sheet of polymer adhered to the cloth. The cloth was then suspended in an air oven and heated to 130° C. for 30 minutes. At the end of this time the sheet of material resembled well vulcanized rubber and was strong and elastic.

Example X

A compound consisting of 100 parts of the plastic polymer, 1.5 parts phenyl beta naphthylamine, and 30 parts of zinc oxide was placed in a mold and pressed into a sheet .080 inch thick. The mold and sheet were then heated to a temperature of 140° C. for 20 minutes. The resulting product resembled vulcanized rubber, and gave a tensile strength of 3400 lbs/in$^2$ with an elongation at break of 860%. When vulcanized for 80 minutes at 140° C. the tensile strength was 3375 lbs/in$^2$ and the elongation at break was 840%.

Example XI 100 grams of plastic polymer, 20 grams of zinc oxide, 1 gram of stearic acid and 1.5 grams of catechol were mixed to a smooth cement with 600 cc. of benzene. A balloon was made by dipping a suitable form ten times in the cement with a period of drying between dips at a temperature below 50° C. to form a layer of the plastic product. After the desired thickness had been built up the form and film of polymer were placed in an air oven at 130° C. for 35 minutes. The resulting product resembled vulcanized natural rubber.

Example XII

A compound which consisted of

| | Pounds |
|---|---|
| 2-chlor-buta-1:3-diene polymer | 10.0 |
| Zinc oxide | 7. |
| Clay | 14. |
| Mineral oil | 0.5 |
| Paraffin | 0.2 |
| Pine tar | 0.3 |
| Phenyl beta naphthylamine | .15 | was prepared by the usual milling operation.

This compound forced through a tubing machine to form the insulation for #16 gauge copper wire. The insulated wire was coiled in circular pans and buried in soapstone in the manner usually employed with wire insulated with natural rubber. The pan containing the soapstone and insulated wire was then heated in open steam at 135° C. The resulting product resembled insulated wire prepared with natural rubber.

Example XIII

A compound composed of

| | Parts |
|---|---|
| 2-chlor-buta-1:3-diene polymer | 100 |
| Zinc oxide | 30 |
| Clay | 60 |
| Stearic acid | 1 |
| Red oxide | 5 |
| Hydroquinone | 1 | was mixed with enough benzene to form a soft dough.

This dough was then spread on the surface of white broadcloth and dried. After drying the cloth and rubber were heated in air to 135° C. for 35 minutes. The resulting product resembled proofed fabric prepared with natural rubber.

Example XIV

A gasket for use in pipe lines was prepared from the following compound:

| | Parts |
|---|---|
| Plastic polymer | 100 |
| Thermatomic carbon | 70 |
| Zinc oxide | 25 |
| Lithopone | 5 |
| Stearic acid | 1 |
| Phenyl beta naphthylamine | 1.5 |

This compound was placed in a hot mold and pressed into the form of a ring. The mold and compound were then heated at 138° C. for 45 minutes. At the end of this time the gasket was removed from the mold and found to be well vulcanized.

Example XV

A compound composed of

| | Parts |
|---|---|
| Plastic polymer | 100 |
| Oleic acid | 2 |
| Phenyl beta naphthylamine | 3 |
| Zinc dust | 5 | was calendered on one surface of white cotton cloth, and vulcanized in air at 70° C. for 18 hours. At the end of this time the rubber was highly elastic and well vulcanized.

Example XVI

A hose was constructed from the following compounds and illustrates the use of a combination of natural rubber and plastic polymer.

Hose tube

| | Parts |
|---|---|
| Plastic polymer | 100 |
| Zinc oxide | 25 |
| Thermatomic carbon black | 75 |
| Stearic acid | 1 |
| Phenyl beta naphthylamine | 1.5 |

Friction and cover stock

| | Parts |
|---|---|
| Smoked sheets | 100 |
| Zinc oxide | 30 |
| Sulfur | 3 |
| Stearic acid | 3 |
| Mercapto benzothiazole | 0.5 |
| Blue color | 2 |

A one inch hose was constructed by first covering a mandrel with the hose tube stock which had been calendered into a sheet. Two layers of fabric coated with friction and cover stock were next applied. This was followed by a layer of friction and cover stock which had been calendered into a smooth sheet. The hose was then wrapped with a moist cloth and vulcanized in open steam at 40 pounds pressure for 40 minutes. At the end of this time the hose was removed from the mandrel, and found to be well vulcanized.

From the above examples it will be apparent that the plastic material may be cured under a variety of conditions. The temperature may be widely varied and generally speaking the higher the temperature the faster the cure. This is likewise true as to pressure. The use of temperatures below 50° C., however, results in materially reducing the rate of the cure while the use of temperatures above 180° C., especially in the presence of air, unless only momentary, are likely to deleteriously affect the product. The preferred temperature range therefore lies between 50 and 180° C. with suitable regard for the duration of the treatment. A series of varying temperatures may obviously also be employed or if desired the compound may also be heated for a short time in the mold to reduce the plastic properties, and afterward removed from the mold and the heating continued. Various combinations of fillers may be employed.

It will be obvious that while the production of shaped articles from natural rubber and its compounds is well known, the present method differs from that employed with natural rubber and other synthetic rubbers in the absence of sulfur. This fact, in addition to eliminating an essential step in the process of vulcanization, in many instances confers a distinct and important advantage upon the product since the cured article is free from staining action on copper, silver and other metals easily tarnished by sulfur. Another advantage is the freedom from sulfur bloom which often occurs on articles composed of natural rubber. A still further advantage is seen in the wide range of cures possible, as illustrated in Example II, without the excessive stiffening or hardening found in compounds composed of natural rubber and containing varying amounts of sulfur.

The properties of the cured product are essentially the same as those of the tough elastic polymer of Carothers and Collins.

It will be obvious from the plastic properties of the uncured synthetic rubber obtained by the present process and its adaptability to be worked and molded before curing that it may be employed to manufacture articles in any shape. The number of uses to which natural rubber may be put is legion and it is impossible to attempt to enumerate them all here. But, as could be predicted from the general similarity in properties, the new material may be employed as a general substitute for natural rubber. In cured form it is tough and very elastic. Its resistance to the action of solvents and chemical agents generally is superior to that of natural rubber. Thus it is not strongly swelled by aliphatic hydrocarbon solvents as natural rubber is. Its electrical resistance is extremely high, also its resistance to the action of sunlight. It may be compounded with the ingredients commonly employed with natural rubber. It is therefore not only adapted to any use to which cured natural rubber may be put, but for many such uses is much superior to natural rubber. It is a suitable material for coating compositions and coverings (including floor coverings), erasers, rug anchors, tires, pneumatic and liquid containers, shock absorbants, play balls, hard rubber articles, elastics, hose tubings, sheets and gaskets, stoppers, as an electrical insulator, etc. It may be applied, as a coating, to fabrics of various types including textiles, paper, leather, etc.

As many apparent and widely different embodiments of this invention may be made without departing from the spirit thereof, it is to be understood that I do not limit myself to the foregoing examples or descriptions except as indicated in the following claims:

I claim:

1. The process of obtaining a plastic polymer which comprises partially polymerizing 2-chlor-buta-1.3-diene and separating the unpolymerized material from the partially polymerized 2-chlor-buta-1:3-diene.

2. The process which comprises polymerizing 2-chlor-buta-1:3-diene to obtain a 2-chlor-buta-1:3-diene solution of a plastic polymerizable polymer and removing unpolymerized material from said solution under such conditions that the plasticity of said polymer is preserved.

3. The process of preparing a plastic polymer which comprises subjecting 2-chlor-buta-1:3-diene to conditions adapted to cause polymerization, interrupting the polymerization before it proceeds beyond the point where the resulting solution of the polymer in 2-chlor-buta-1:3-diene becomes too stiff to pour and separating the partially polymerized plastic material.

4. The process which comprises polymerizing 2-chlor-buta-1:3-diene at a temperature not in excess of 50° C. to obtain a 2-chlor-buta-1:3-diene solution of a plastic polymerizable polymer and removing unpolymerized 2-chlor-buta-1:3-diene from said solution at a temperature not in excess of 50° C.

5. The process of preparing a plastic polymer which comprises polymerizing 2-chlor-buta-1:3-diene to obtain a 2-chlor-buta-1:3-diene solution of a plastic polymerizable polymer and precipitating the plastic polymerized material from said solution.

6. The process which comprises polymerizing 2-chlor-buta-1:3-diene at a temperature not in excess of 50° C. to obtain a 2-chlor-buta-1:3-diene solution of a plastic polymerizable polymer and precipitating polymerized 2-chlor-buta-1:3-diene from said solution at a temperature not in excess of 50° C.

7. The process of claim 6 wherein the precipitation is effected by an inert solvent for the 2-chlor-buta-1:3-diene in which solvent the plastic polymer is insoluble.

8. The process of claim 6 wherein the precipitating agent is an inert liquid solvent of the group consisting of acetone, methyl ketone, methyl-ethyl ketone and methyl, ethyl, butyl, propyl and isopropyl alcohol.

9. The process of claim 6 wherein the precipitating agent is ethyl alcohol.

10. The process of claim 4 wherein the steps of polymerizing and removal of 2-chlor-buta-1:3-diene are carried out below 30° C.

11. The process of claim 4 wherein the steps of polymerizing and removal of 2-chlor-buta-1:3-diene are carried out below 30° C. and the polymerization is carried out under the influence of direct light.

12. The process of claim 4 wherein the steps of polymerizing and removal of 2-chlor-buta-1:3-diene are carried out below 30° C. and the polymerization is carried out under the influence of ultra-violet light.

13. The process which comprises polymerizing 2-chlor-buta-1:3-diene to obtain a 2-chlor-buta-1·3-diene solution of a plastic polymerizable polymer and distilling off unpolymerized material from said solution under such conditions that the plasticity of said polymer is preserved.

14. The process which comprises polymerizing 2-chlor-buta-1:3-diene at a temperature not in excess of 50° C. to obtain a 2-chlor-buta-1:3-diene solution of a plastic polymerizable polymer and distilling off unpolymerized 2-chlor-buta-1:3-diene at a pressure below normal pressure.

15. The process of claim 14 wherein the steps of polymerizing and distilling are carried out below 30° C.

16. The process of claim 14 wherein the steps of polymerizing and distilling are carried out below 30° C. and the polymerization is carried out under the influence of direct light.

17. The process which comprises polymerizing 2-chlor-buta-1:3-diene at a temperature between 5° and 25° and under the influence of ultra-violet light to obtain a viscous 2-chlor-buta-1:3-diene solution of a plastic polymer and while agitating said solution distilling off unpolymerized 2-chlor-buta-1:3-diene at sub-atmospheric pressure.

18. The process which comprises partially polymerizing 2-chlor-buta-1:3-diene separating the unpolymerized material from the polymer and thereafter effecting further polymerization of said polymer.

19. The process of forming a tough elastic product which comprises polymerizing a plastic benzene soluble polymerizable 2-chlor-buta-1:3-diene polymer in the absence of substantial quantities of unpolymerized 2-chlor-buta-1:3 diene.

20. The process of claim 19 in which the polymer is heated to effect polymerization.

21. The process of claim 19 in which the 2-chlor-buta-1:3-diene polymer is heated to a temperature between 50 and 180° C.

22. The process of forming an article of manufacture which comprises milling and shaping a plastic benzene soluble polymerizable 2-chlor-buta-1:3-diene polymer and thereafter subjecting the shaped mass to conditions adapted to cause polymerization.

23. The process of forming an article of manufacture which comprises shaping a product, the polymerizable constituent of which consists substantially of a plastic benzene soluble polymerizable 2-chlor-buta-1:3-diene polymer and heating the resulting article while preserving its shape to a temperature between 50 and 180° C. until a tough elastic product is obtained.

24. The process of forming an article of manufacture which comprises filling a mold with a plastic benzene soluble polymerizable 2-chlor-buta-1:3-diene polymer, which is substantially free from unpolymerized 2-chlor-buta-1:3 diene, and heating said polymer until a tough elastic product having the shape of the mold is obtained.

25. The process of forming an article of manufacture which comprises spreading a plastic benzene soluble polymerizable 2-chlor-buta-1:3-diene polymer, which is substantially free from unpolymerized 2-chlor-buta-1:3 diene, upon a surface in a thin sheet and thereafter polymerizing said polymer to a tough elastic body.

26. The process of claim 25 wherein the plastic polymer is dissolved in an inert volatile solvent before spreading upon a smooth surface, the solvent is removed to obtain a coating of plastic polymer and the tough elastic material resulting from final polymerization is thereafter removed from the surface to obtain an article of predetermined shape.

27. A plastic, polymerizable, benzene soluble 2-chlor-buta-1:3-diene polymer, said polymer being substantially free of unpolymerized 2-chlor-buta-1:3 diene.

28. A plastic, polymerizable, benzene soluble 2-chlor-buta-1:3-diene polymer obtained by the process of claim 1 and in the form of a shaped article.

29. A molded article made from a plastic polymer of 2-chlor-buta-1:3-diene obtained by the process of claim 1.

30. A plastic, polymerizable 2-chlor-buta-1:3-diene polymer obtained by the process of claim 1 in the form of a thin sheet.

31. Fabric coated with a plastic polymerizable 2-chlor-buta-1:3-diene polymer obtained by the process of claim 1.

32. A shaped article of manufacture composed of a tough elastic rubber-like polymer of a plastic polymer of 2-chlor-buta-1:3-diene, said article having been shaped while the polymer was in plastic form and substantially free from unpolymerized 2-chlor-buta-1:3-diene.

33. An article of manufacture obtained by partially polymerizing 2-chlor-buta-1:3-diene to form a 2-chlor-buta-1:3-diene solution of a plastic polymerizable polymer, removing unpolymerized 2-chlor-buta-1:3-diene under conditions adapted to preserve the plasticity of the polymer and thereafter completing the polymerization.

34. An article of manufacture obtained by partially polymerizing 2-chlor-buta-1:3-diene to form a 2-chlor-buta-1:3-diene solution of a plastic polymerizable polymer, removing unpolymerized 2-chlor-buta-1:3-diene under conditions adapted to preserve the plasticity of the polymer, shaping the resulting product and thereafter subjecting the shaped product to conditions adapted to effect further polymerization.

35. The process of obtaining a plastic polymer which comprises partially polymerizing 2-halogen-buta-1:3-diene and separating the unpolymerized material from the partially polymerized 2-halogen-buta-1:3 diene.

36. A plastic, polymerizable, benzene soluble 2-halogen-buta-1:3-diene polymer obtained by the process of claim 35.

37. A hollow shaped article of manufacture composed of a tough elastic rubber like polymer of a plastic polymer of 2-chlor-buta-1:3-diene, said article having been shaped while the polymer was in plastic form and substantially free from unpolymerized 2-chlor-buta-1:3-diene.

38. A tube composed of a tough elastic rubber like polymer of a plastic polymer of 2-chlor-buta-1:3-diene, said tube having been shaped while the polymer was in plastic form and substantially free from unpolymerized 2-chlor-buta-1:3-diene.

IRA WILLIAMS.

DISCLAIMER 1,950,436.—*Ira Williams*, Wilmington, Del. POLYMERIZED HALOGENATED HYDRO-
CARBONS AND PROCESS OF PRODUCING SAME. Patent dated March 13,
1934. Disclaimer filed November 13, 1939, by the assignee, *E. I. du Pont de Nemours and Company, Inc.*

Hereby enters this disclaimer to the last six words in line 115, column 2, page 2, of the specification of said patent, to wit: "methyl ethyl ketone and diethyl ketone"; and Further enters this disclaimer to the last two words of line 3 and the first three words of line 4 of claim 8 of the specification of said patent, to wit: "methyl ketone, methyl-ethyl ketone".

[*Official Gazette December 5, 1939.*]